United States Patent [19]

Demizu et al.

[11] Patent Number: 5,090,383
[45] Date of Patent: Feb. 25, 1992

[54] IGNITION TIMING CONTROL APPARATUS FOR AN INTERNAL COMBUSTION ENGINE

[75] Inventors: Akira Demizu, Himeji; Hitoshi Inoue, Amagasaki, both of Japan

[73] Assignee: Mitsubishi Denki Kabushiki Kaisha, Tokyo, Japan

[21] Appl. No.: 696,804

[22] Filed: May 7, 1991

[30] Foreign Application Priority Data

Jun. 13, 1990 [JP] Japan .................................. 2-154418

[51] Int. Cl.[5] ............................................. F02P 5/15
[52] U.S. Cl. .................... 123/425; 364/431.08
[58] Field of Search .................... 123/425, 435; 364/431.08

[56] References Cited

U.S. PATENT DOCUMENTS

| | | | |
|---|---|---|---|
| 4,271,799 | 6/1981 | Kato et al. | 123/425 |
| 4,455,980 | 6/1984 | Sasayama et al. | 123/425 |
| 4,556,030 | 12/1985 | Aono | 123/425 |
| 4,624,229 | 11/1986 | Matekunas | 123/425 |
| 4,802,455 | 2/1989 | Abo | 123/425 |
| 4,875,450 | 10/1989 | Yoshikawa et al. | 123/425 |
| 4,936,276 | 6/1990 | Gopp | 123/425 |
| 4,971,007 | 11/1990 | Gopp et al. | 123/425 |
| 4,984,546 | 1/1991 | Shimomura et al. | 123/425 |

FOREIGN PATENT DOCUMENTS

62-58055  3/1987  Japan .

Primary Examiner—Willis R. Wolfe
Attorney, Agent, or Firm—Sughrue, Mion, Zinn, Macpeak and Seas

[57] ABSTRACT

An ignition timing control apparatus for an internal combustion engine which comprises: pressure detecting means for detecting a pressure in a cylinder; knocking detecting means based on an output of the pressure detecting means; crank angle detecting means for detecting a crank angle; indicated mean effective pressure calculating means from the output of the pressure detecting means and an output of the crank angle detecting means; indicated mean pressure averaging means; load detecting means; revolution number detecting means from an output of the crank angle detecting means; running condition judging means for judging a running condition from an output of the load detecting means and an output of the revolution number detecting means; control means for controlling an ignition timing so that an average value of the indicated mean effective pressure is maximized, in a predetermined running condition of the engine determined by the running condition judging means; and contorl quantity memorizing means for memorizing an ignition timing control quantity in case when a knocking is not generated, which maximizes the average value of the indicated mean effective pressure outputted from the control means; said control means controlling the ignition timing, in a region in which the knocking is not generated, based on a memorized value of the control quantity memorizing means, when the knocking detecting means detects a knocking.

1 Claim, 9 Drawing Sheets

IGNITION TIMING CONTROL APPARATUS FOR AN INTERNAL COMBUSTION ENGINE

BACKGROUND OF THE INVENTION

1. Field of the Invention

The present invention relates an ignition timing control apparatus for an internal combustion engine (hereinafter, an engine) capable of detecting a level of knocking, and controlling an ignition timing corresponding to a result of the detection.

2. Discussion of Background

As a conventional ignition timing control apparatus for an engine, there is one disclosed, in Japanese Unexamined Patent Publication No. 58055/1987. This apparatus detects a crank angle ($\theta_{pmax}$) in which a combustion pressure is maximized, from an inner cylinder pressure (pressure inside of cylinder) of the engine, and detects knocking by the comparison between $\theta_{pmax}$ and a knocking limit value ($\theta_k$) of a knocking generation limit which corresponds with a running condition of the engine predetermined by a revolution number and a load of the engine. When $\theta_{pmax} \geq \theta_k$, a judgment is made wherein the knocking is not generated, and the ignition timing is advanced. When $\theta_{pmax} < \theta_k$, a judgment is made wherein the knocking is not generated, and the ignition timing is retarded for the control of knocking.

Since the conventional ignition timing control device of an engine is composed as mentioned above, a crank angle wherein the combustion pressure is maximized, is detected. However, this value does not directly represent the output of the engine. Therefore, even if the engine is controlled with the ignition timing determined by this value, the maximum output of the engine may not be attained.

Moreover, the predetermined knocking limit value ($\theta_k$) of the knocking generation limit may be deviated from the optimum value due to the variation of the engine or the timewise change of the engine. This causes the lowering of the detection accuracy of knocking or the delay of the control response. In such case the knocking may not be controlled, or the responsiveness of the control may be delayed.

SUMMARY OF THE INVENTION

It is an object of the present invention to provide an ignition timing control apparatus for an engine capable of controlling knocking in spite of the variation of parts of the engine, or the timewise change of the engine, or a change of environment and capable of controlling the driving of the engine in an optimum ignition timing so that the output of the engine is maximized.

According to an aspect of the present invention, there is provided an ignition timing control apparatus for an internal combustion engine which comprises: pressure detecting means for detecting a pressure in a cylinder of the internal combustion engine; knocking detecting means for detecting a level of the knocking in the internal combustion engine based on an output of the pressure detecting means; crank angle detecting means for detecting a crank angle; indicated mean effective pressure calculating means for calculating an indicated mean effective pressure of the engine from the output of the pressure detecting means and an output of the crank angle detecting means; indicated mean pressure averaging means for averaging an output of the indicated mean effective pressure calculating means; load detecting means for detecting a load of the internal combustion engine; revolution number detecting means for detecting a revolution number of the internal combustion engine from an output of the crank angle detecting means; running condition judging means for judging a running condition of the internal combustion engine from an output of the load detecting means and an output of the revolution number detecting means; control means for controlling an ignition timing so that an average value of the indicated mean effective pressure is maximized, in a predetermined running condition of the engine determined by the running condition judging means; and control quantity memorizing means for memorizing an ignition timing control quantity in case when a knocking is not generated, which maximizes the average value of the indicated mean effective pressure outputted from the control means; said control means controlling the ignition timing, in a region in which the knocking is not generated, based on a memorized value of the control quantity memorizing means, when the knocking detecting means detects a knocking.

BRIEF DESCRIPTION OF THE DRAWINGS

More complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
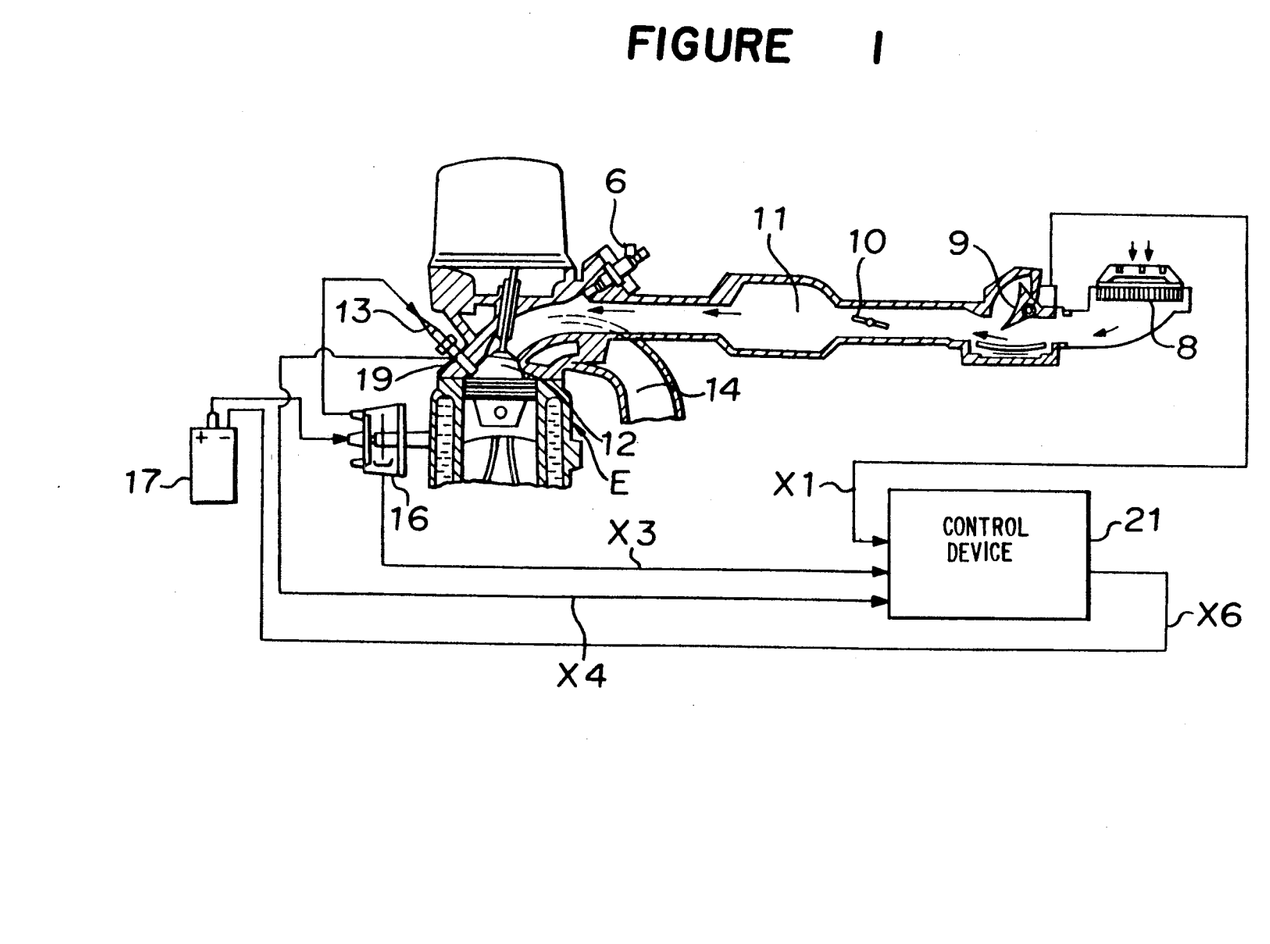
FIG. 1 is a diagram showing an embodiment of an ignition timing control apparatus of an engine according to the present invention.

Referring to the drawings, an embodiment of the ignition timing control device of the engine of this invention will be explained. FIG. 1 is a diagram showing an embodiment of the ignition timing control device of the engine of this invention. In FIG. 1, air passes through the air cleaner 8, is measured by the air-flow meter 9, of which flow quantity is regulated by the throttle valve 10, passes through the suction air manifold 11, mixed with fuel by the fuel injection valve 6

(air-fuel mixture), and is sent to the cylinder 12 of the engine E (hereafter the notation is omitted).

The mixture is compressed in cylinder 12, and ignited by the plug 13 at a pertinent timing. The exhaust gas passes through the manifold 14 and a purifier, not shown, to the air.

A numeral 16 signifies a crank angle sensor for detecting a rotation angle of a crank axle of the engine, incorporated in a distributor, a numeral 17, an ignition device, and a numeral 21, a control device which controls the ignition timing of the engine.

The crank angle sensor 16 outputs a reference position pulse at every reference position of the crank angle (every 180 degrees for four cylinder engine, every 120 degrees for six cylinder engine), and outputs a unit angle pulse at every unit angle (for instance every 2 degrees). By counting the numbers of the unit angle pulse after the reference position pulse is inputted in the control device 21, the current crank angle can be known.

Figure 2A:
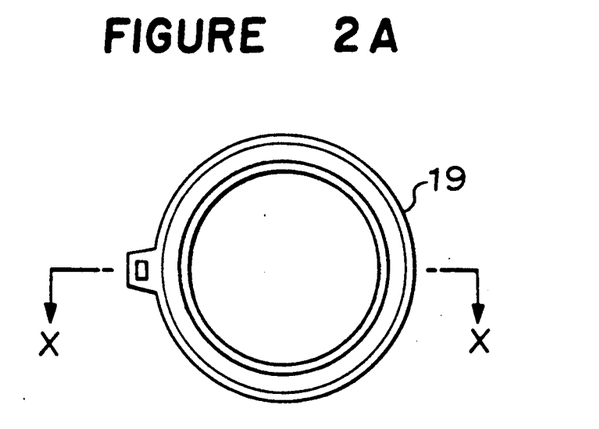
FIG. 2A is a front view of a pressure sensor.
Figure 2B:
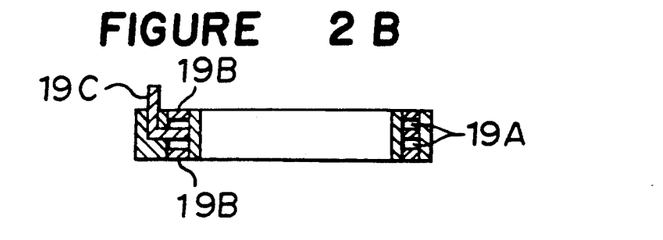
FIG. 2B is a sectional view of the pressure sensor taken along a line X—X.

The numeral 19 signifies a pressure sensor which detects an inner cylinder pressure. As the pressure sensor 19, an electric voltage element is formed like a washer as shown in FIG. 2A which is a front view, and in FIG. 2B (a sectional view taken along a line X—X of FIG. 2A). The pressure sensor 19 is composed of the ring-like piezoelastic element 19A, the ring-like minus electrode 19B, and the plus electrode 19C.

Figure 3:
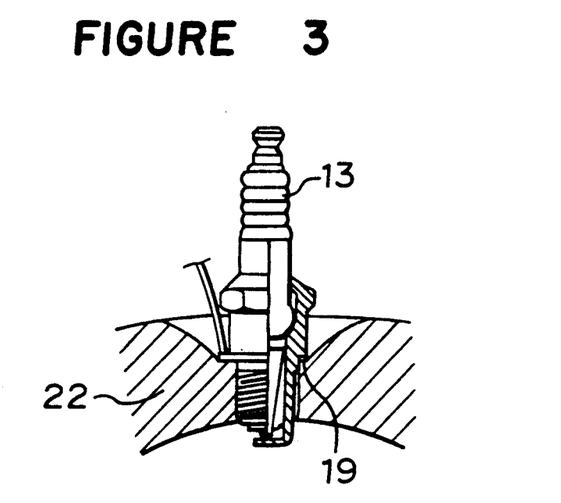
FIG. 3 is a partially cutaway view showing the mounting of the pressure sensor.

The pressure sensor 19 is mounted on the cylinder head 22 as shown in FIG. 3. The pressure sensor 19 is fixed to the cylinder head 22 by clamping with the ignition plug 13 as a washer. The pressure sensor 19 takes out the change of pressure in the cylinder 12 as an electric signal.

The control device 21 receives detection air quantity signal X1 from the air-flow meter 9, the crank angle signal X3 from the crank angle sensor 16, and the pressure signal X4 from the pressure sensor 19, performs a predetermined calculation, and outputs the ignition signal X6, by which the ignition device 17 is controlled.

Figure 4:
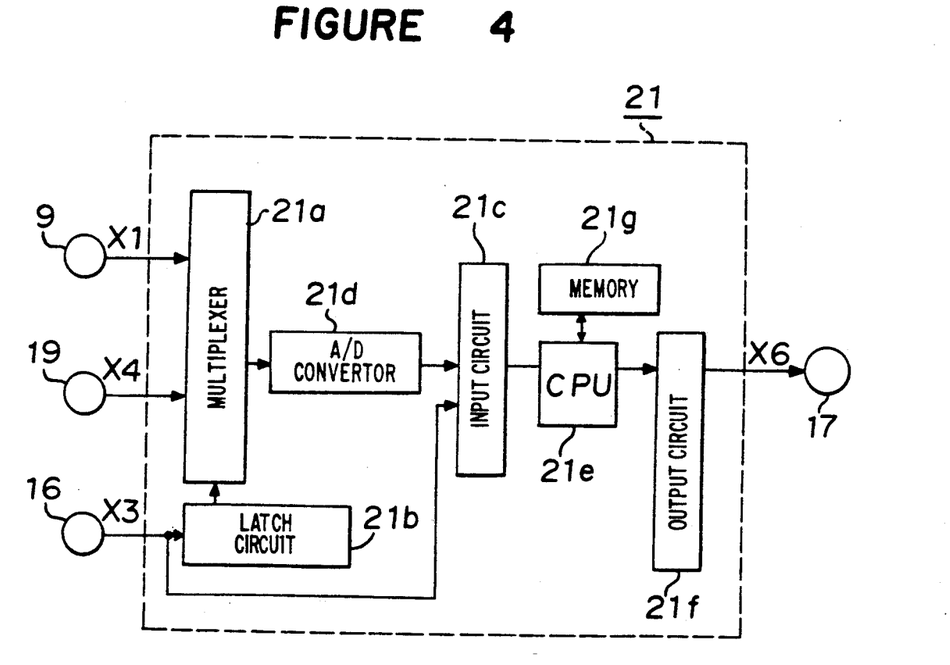
FIG. 4 is a block diagram showing the inner structure of the control apparatus in FIG. 1.

FIG. 4 is a block diagram showing the inner structure of the control device 21. In FIG. 4, the suction air quantity signal X1 from the air flow meter 9, and the pressure signal X4 from the pressure sensor 19 are inputted to the multiplexor 21a (which incorporates an input interface) of the control device 21.

The crank angle signal X3 from the crank angle sensor 16 is inputted to the latch circuit 21b and the input circuit 21c.

By inputting the crank angle signal X3 to the latch circuit 21b, the latch circuit 21b outputs to the multiplexor 21a. The multiplexor 21a, by switching the inputs from the suction air quantity signal X1 and the pressure signal X4, selectively outputs each signal to the A/D (analogue/digital) convertor 21d.

The respective signal converted by the A/D convertor 21d to a digital signal and the crank angle signal X3 are sent to the CPU (central processing unit) 21e through the input circuit 21c, treated by a calculation, shown in a flow chart, mentioned later. The calculated ignition timing control signal is sent to the ignition device 17, after it is converted to the ignition signal X6 by the output circuit 21f.

21g is a memory, which is composed of a RAM (random access memory) that temporarily memorizes the data and the like in the calculation of the CPU 21e, a ROM (read only memory) that memorizes before and the calculation procedure etc. and the like.

Figure 5:
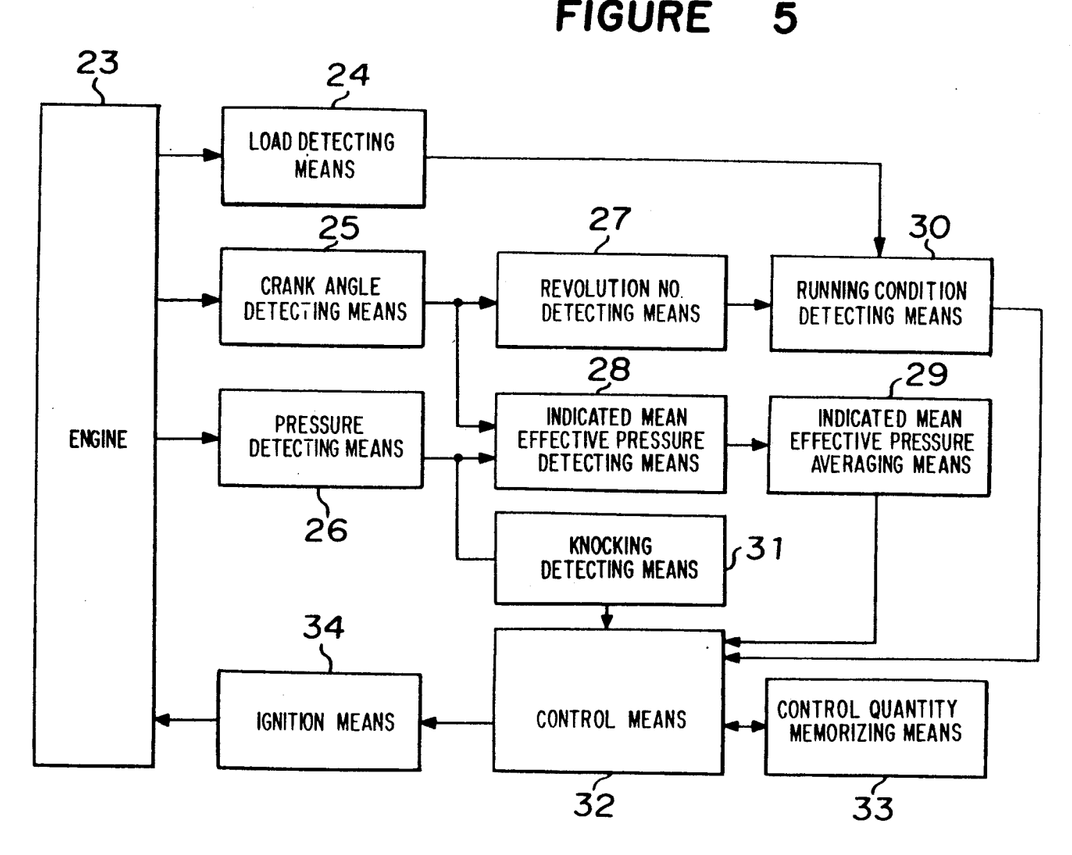
FIG. 5 is a block diagram showing the function of the important parts of the present invention.

FIG. 5 is a block diagram showing the function of the important parts in this invention. In FIG. 5, a numeral 23 signifies an engine which is the object of control, and a numeral 24, a load detection means for detecting the load of the engine 23.

The load detecting means 24 is for instance, the air-flow meter 9 shown in FIG. 1, or a suction pipe sensor which detects a suction pipe pressure on the downstream side of the throttle valve 10, or a throttle valve opening degree sensor (not shown) for detecting the opening degree of throttle valve 10 in FIG. 1.

A numeral 25 signifies a crank angle detecting means which detects the crank angle, which for instance, corresponds to the crank angle sensor in FIG. 1.

A numeral 26 signifies a pressure detecting means, for detecting the inner pressure of the cylinder 12, which, for instance, corresponds to the pressure sensor 19 and the like.

A numeral 27 signifies a rotation number detecting means. The rotation number detecting means 27 detects the rotation number of the engine from the time required for between the predetermined crank angles by the output signal of the crank angle detecting means 25.

A numeral 28 signifies an indicated mean effective pressure detecting means, which is obtained by each output of the crank angle detecting means 25 and the output of the pressure detecting means 26. Suppose that the inner cylinder pressure at each crank angle is $P_n$, the change of the stroke volume with the change of the crank angle by a predetermined angle (for instance 2 degrees) is $\Delta V$, and the stroke volume is V, the indicated mean effective pressure $P_i$ can be obtained by $P_i = \Sigma(P_n \times \Delta V)/V$.

Since in this calculation, V is constant, $P_i$ can be approximated by the equation $P_i = P_i + \Delta V \cdot P_n$.

A numeral 29 signifies an indicated mean effective pressure averaging means, whereby an average value of the indicated mean effective pressure is obtained through the arithmetic mean of a predetermined numbers of the outputs of the indicated mean effective pressure detecting means 28.

The running condition criteria means 30 determines whether the current running condition of the engine 23 satisfies a predetermined condition, from an output of the load detecting means 24 and an output of the revolution number detecting means 27.

A numeral 31 signifies a knocking detecting means for detecting generation of knocking, which detects the level of the knocking based on the output of the pressure detecting means 26.

The control device 32 determines that the engine 23 is in a predetermined running condition, from outputs of the running condition criteria means 30 and the indicated mean effective pressure averaging mean 29. The control device 32 obtains the ignition timing when the average value of the indicated mean effective pressure is maximized. The control means 32 receives the outputs of the knocking detecting means 31, which replaces the current ignition timing to the ignition timing memorized in the control quantity memorizing means 33, mentioned later, in case of the generation of the knocking, and determines the required ignition timing in case that the knocking is not generated.

The control quantity memorizing means 33 memorizes the ignition timing when the average value of the indicated mean effective pressure is maximized in case of no generation of the knocking, and under a predetermined running condition that is determined by the control means 32, as well as the maximum value of the indicated mean effective pressure.

A numeral 34 signifies an igniting means, which performs the ignition at an ignition timing which corresponds to an ignition timing control signal given by the control means 32. This ignition means 34, for instance, may utilize a full transistor type ignition device (device composed of a power transistor switching circuit and an ignition coil), and the ignition plug 13.

The elements shown by the above notations 27 to 33 are incorporated in the control device 21 in FIG. 1.

First of all, a well known detecting method of knocking will be mentioned. Generally speaking, the knocking phenomena shows an abnormal combustion due to early ignition of unburnt mixture in cylinder, whereby an abnormal pressure vibration is generated in the cylinder of the engine 23. This pressure vibration is detected by the pressure detecting means 26, and is transmitted to the knocking detecting means 31. The knocking detecting means 31, for instance, treats the detected signal by a band path filter or the like, and detects the knocking level by the size of the signal. The result of the detection by the knocking detecting means 31, on whether the intensity of the knocking is above or below a predetermined value, is sent to the control means 32 as an interruption signal. When the intensity is above the predetermined value, the control device 32 set the knock flag FnK as the generation of the knocking. When the intensity is below the predetermined value, the control device 32 reset the knock flag FnK as non-generation of the knocking. The above method of direction of the knocking, is treated by an interruption treatment routine, not shown.

Figure 6:
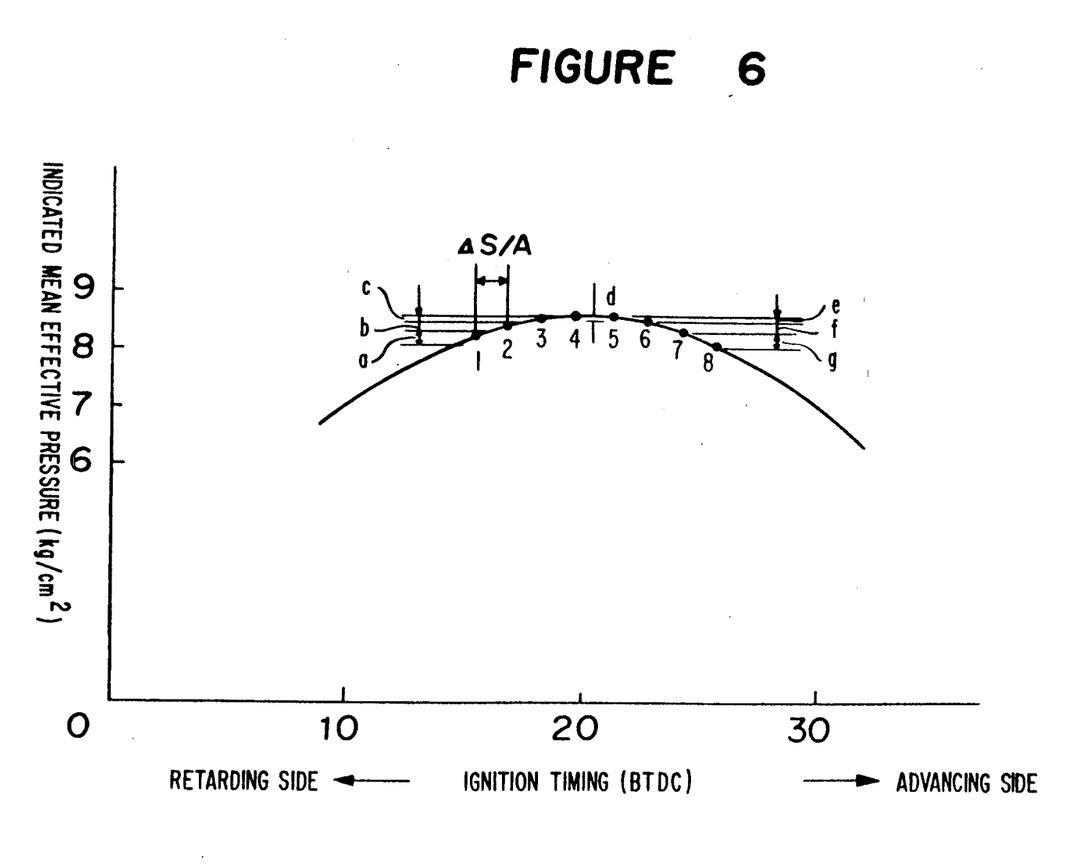
FIG. 6 is a graph showing the indicated mean effective pressure characteristic for the ignition timing, in which the maximum value is to be obtained.

Next, the principle of setting the ignition timing, in which the indicated means effective pressure is maximized, will be explained, under a predetermined running condition as shown in FIG. 6, when the ignition timing has a relationship with the indicated mean effective pressure characteristic (Actually the indicated mean effective pressure in FIG. 6 is an average value thereof. Hereinafter, the indicated mean effective pressure is used as representative of the means value thereof). First of all, explanation will be given to the measured indicated mean effective pressure. The respective combustion in the engine, varies with cycle. The measured indicated means effective pressure varies even if the ignition timing remains the same. Accordingly, judgment should be given by utilizing an indicated mean effective pressure which is averaged for several cycles of combustion.

However, practically, even the averaged indicated mean effective pressure $P_i$ has a variation. Therefore the indicated mean effective pressure $P_i$ which is measured at a set ignition timing, should be considered to falls in a width of variation to a certain degree.

Next, to detect that the indicated mean effective pressure is at a maximum value thereof at a set ignition timing, in case that the ignition timing versus the mean effective pressure has a relationship shown in FIG. 6, the ignition timing is changed, and the increase or the decrease of the indicated mean effective pressure $\Delta P_i$ is investigated.

Accordingly, to determine that the indicated mean effective pressure has a maximum value at the set ignition timing, the set ignition timing is changed and the result of the change is investigated wherein the change of the indicated mean effective pressure $\Delta P_i$ is decreased or increased.

Next, explanation will be given on the procedure of the determining whether the indicated mean effective pressure is maximized.

As shown in FIG. 6, when the set ignition timing is changed as in ① to ⑧ (which represent the set ignition timings), the absolute value of the difference of the indicated mean effective pressure $|\Delta P_i|$ is obtained as in ⓐ to ⓖ (which represents the absolute values of the difference of the indicated mean effective pressure).

In FIG. 6, ⓐ is the difference of the indicated mean effective pressure $\Delta P_i$ when the ignition time is changed from the ignition timing ① to the ignition timing ②. The absolute values of the differences of the indicated mean effective pressure ⓑ to ⓖ are obtained similarly.

As mentioned above, since the indicated mean effective pressure $P_i$ which is obtained by a calculation of average, varies, a dead zone $|\Delta P_{ip}|$ is utilized, a variation width, in which the indicated mean effective pressure is regarded as not to increase or not to decrease.

Accordingly, when $|\Delta P_i| \leq |\Delta P_{ip}|$ is established, the indicated mean effective pressure reference $\Delta P_i$ is regarded as not to increase or no to decrease. By using this dead zone $|\Delta P_{ip}|$, for instance, the following relationship is established.

$$\text{ⓐ, ⓖ} > |\Delta P_{ip}| > \text{ⓑⓒⓓⓔⓕ} \tag{2}$$

This relationship, as shown in FIG. 6, means that the maximum value of the indicated mean effective pressure exists between the set ignition timings ② and ⑦.

In this case, it is natural to think that the air fuel ratio which maximizes the indicated mean effective pressure, falls at the center between the ignition timings ② and ⑦. When we consider in this way, the procedure to determine the ignition timing which is at the center of the ignition timings ② to ⑦, is as follows.

When the ignition timing is changed for instance from ① by $\Delta S/A$, and from when the absolute value of the difference of the indicated mean effective pressure $|\Delta P_i|$ becomes smaller than $|\Delta P_{ip}|$, (which, for instance, corresponds to the ignition timing ② in FIG. 6), counting is continued one by one until the absolute value of the difference of the indicated mean effective pressure $|\Delta P_i|$ becomes larger than the dead zone $|\Delta P_{ip}|$ again. The numbers of the counting is determined as C.

In this calculation, $\Delta S/A$ is the quantity of the change of the set ignition timing.

By counting as mentioned above, the ignition timing at the center of between the set ignition timings ② and ⑦ is the value of the ignition timing ⑧ subtracted by $C/2 \times \Delta S/A$.

The method of the subtraction of the ignition timing is as follows. When the direction of the change of the ignition timing towards from the set ignition timing ① to the set ignition timing ⑧ is advancing, that is, in the direction to advance the ignition timing, the ignition timing is retarded.

When the direction of the change of the ignition time towards from the set ignition timing ① to the set ignition timing ⑧, is retarded, the ignition timing is advanced.

In this way, by changing the ignition timing, the ignition timing in which the indicated mean effective pressure is maximized, can be determined.

By above procedures, the ignition timing can be set to the point in which the indicated mean effective pressure has a maximum value.

Next, mention will be given to the content of the calculation of the present invention.

First of all, the method of the calculation of the indicated mean effective pressure is to be explained. This indicated mean effective pressure $P_i$ is a value of the work exerted on a piston by fuel during one cycle (2 revolutions of engine), divided by the stroke volume, which is approximately obtained by using the equation $P_i = P_i + \Delta V \cdot P_n$, where $P_n$ is the inner cylinder pressure at each crank angle, generated from the pressure sensor 19, and $\Delta V$ is the change of the stroke volume by the change of each unit angle (for instance 2 degrees) of crank angle.

Accordingly, the inner cylinder pressure $P_n$ and the change of stroke volume $\Delta V$ in the current calculation are multiplied, and the multiplied result is added to the indicated mean effective pressure Pi in the preceding calculation of (for instance 2 degrees before the crank angle). The added value is regarded as the current indicated mean effective pressure $P_i$. The result of the calculation of the above equation during one cycle (2 revolutions of the engine), is the indicated mean effective pressure $P_i$.

Next, a logic whereby the ignition timing is set in which the indicated mean effective pressure has a maximum value, will be explained.

In the following explanation, the notation "i" signifies the order of calculation. Accordingly, "i" represents the current treatment value, whereas the rotation "i−1" shows the value of the preceding treatment.

First of all, explanation will be given to Flag F1. As mentioned before, to make the indicated mean effective pressure a maximum value, by changing the ignition timing, the process of the changing the ignition timing should be grasped.

Figure 7:
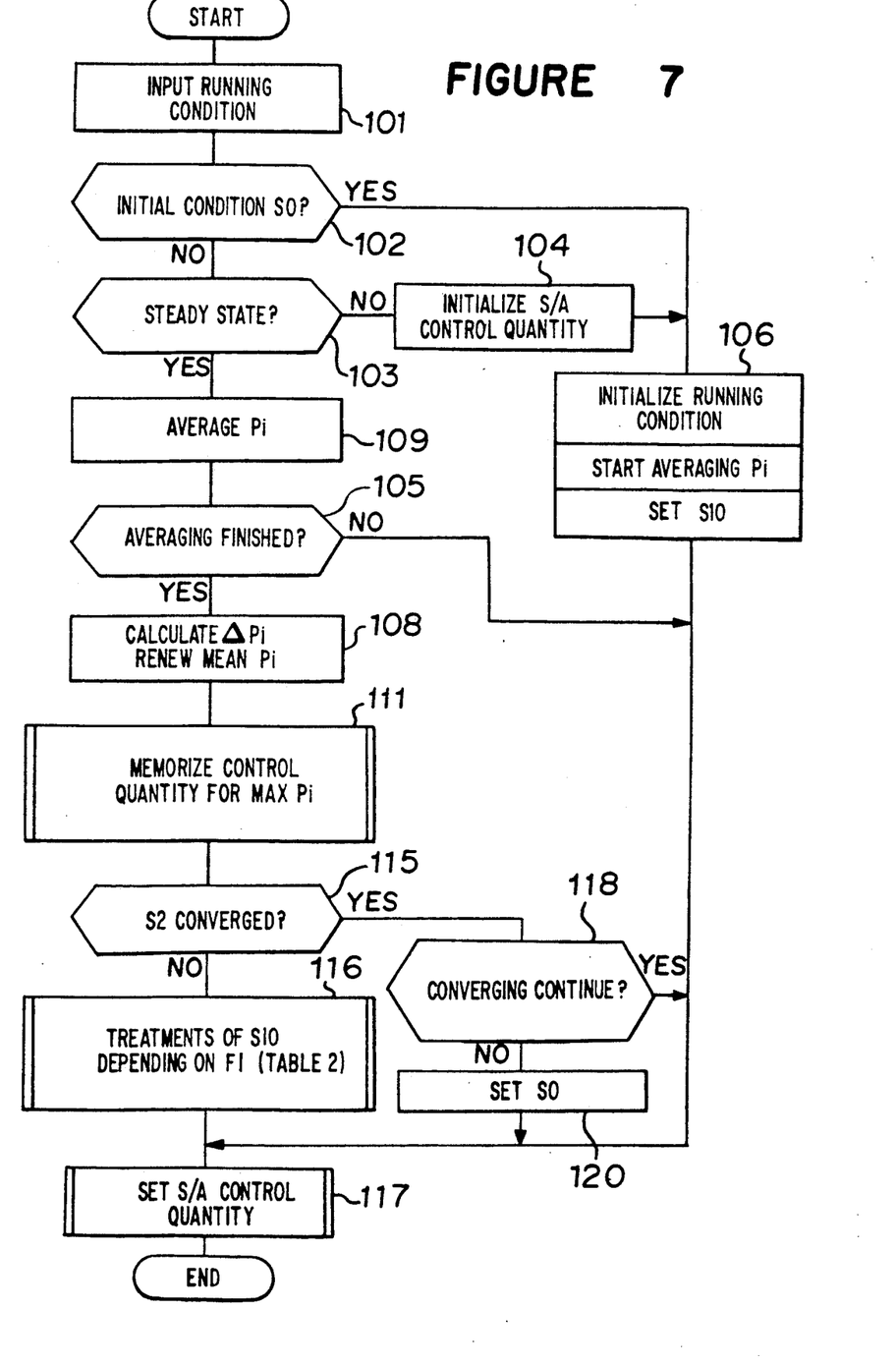
FIG. 7 is a flow chart showing the operation of the control apparatus according to an embodiment of the present invention.

Therefore, a flag is utilized which shows how the preceding ignition timing is set in each treatment of the flow chart shown in FIG. 7. This flag is Flag F1, which grossly classified to the three conditions as in the following Table 1.

TABLE 1

| Flag F1 | Treatment |
|---|---|
| S0 | Represents an initial state wherein the treatment of maximizing the indicated mean effective pressure, is not started. |
| S10–S1A | Represents a state wherein the ignition timing for maximizing the indicating mean effective pressure, is searched by changing the ignition timing, as shown in Table 2. |
| S2 | Represents a state wherein setting of the ignition timing is finished, by which the indicated mean effective pressure is maximized. |

As shown in this Table 1, when Flag F1 is S0, F1 shows an initial state in which the treatment for maximizing the indicated means effective pressure is not started.

Explanation will be given in details in Table 2 in case that flag F1 is S10 to S1A. In short, F1 shows a state in which the operation is determining the ignition timing in which the indicated mean effective pressure has a maximum value, by judging the increase or the decrease of the change of the indicated mean effective pressure $\Delta P_i$ after the ignition timing is advanced or retarded.

When Flag F1 is S2, as F1 shows, as described in Table 1, a state after the ignition timing is set which maximizes the indicated mean effective pressure.

In this way, Flag F1 shows every past history determining the ignition timing.

Next, explanation will be given to the state in which the ignition timing which maximizes the indicated mean effective pressure, is being judged, which is classified in Table 2.

In Table 2 the value of Flag F1 is set, corresponding to the case in which the characteristic of the ignition timing and the indicating mean effective pressure is as shown in FIG. 6, by judging the direction of change of the ignition timing, and the increase and the decrease of the indicated mean effective pressure change $\Delta P_i$, by the change, so that the process of the judgement is expressed.

TABLE 2

| Flag F1 | Treatment |
|---|---|
| S10 | GO TO S11, ΔS/A = RE |
| S11 | if $|\Delta P_i| \leq |\Delta P_{ip}|$, S11 STAY, ΔS/A = RE.<br>if $\Delta P_i$ INC, GO TO S13, ΔS/A = RE.<br>if $\Delta P_i$ DEC, GO TO S12, ΔS/A = ADV. |
| S12 | if $|\Delta P_i| \leq |\Delta P_{ip}|$, GO TO S14, ΔS/A = ADV, START COUNTING NO. OF ADVANCE.<br>if $\Delta P_i$ INC, GO TO S15, ΔS/A = ADV.<br>if $\Delta P_i$ DEC, GO TO S16, ΔS/A = RE.<br>(vibrating around Pi peak) |
| S13 | if $|\Delta P_i| \leq |\Delta P_{ip}|$, GO TO S17, ΔS/A = RE, START COUNTING NO. OF RETARDATION.<br>if $\Delta P_i$ INC, S13 STAY, ΔS/A = RE.<br>if $\Delta P_i$ DEC, GO TO S18, ΔS/A = ADV.<br>(vibrating around Pi peak) |
| S14 | if $|\Delta P_i| \leq |\Delta P_{ip}|$, S14 STAY, ΔS/A = ADV, START COUNTING NO. OF ADVANCE.<br>if $\Delta P_i$ INC, GO TO S15, ΔS/A = ADV.<br>if $\Delta P_i$ DEC, GO TO S19, S/A IS RETARDED BY ((NO. OF ADVANCE + 1)/2) × ΔS/A. |
| S15 | if $|\Delta P_i| \leq |\Delta P_{ip}|$, GO TO S14, ΔS/A = ADV, START COUNTING NO. OF ADVANCE.<br>if $\Delta P_i$ INC, S15 STAY, ΔS/A = ADV.<br>if $\Delta P_i$ DEC, GO TO S16, ΔS/A = RE.<br>(vibrating around Pi peak) |
| S16 | if $|\Delta P_i| \leq |\Delta P_{ip}|$, GO TO S19, ΔS/A STAY.<br>if $\Delta P_i$ INC, GO TO S13, ΔS/A = RE.<br>if $\Delta P_i$ DEC, GO TO S18, S/A IS ADVANCED BY PRECEDING ΔS/A × 1/2, however if the ΔS/A IS SMALLER THAN ΔS/A$_{min}$, GO TO S19. |
| S17 | if $|\Delta P_i| \leq |\Delta P_{ip}|$, S17 STAY, ΔS/A = RE, START COUNTING NO. OF RETARDATION.<br>if $\Delta P_i$ INC, GO TO S13, ΔS/A = RE.<br>if $\Delta P_i$ DEC, GO TO S19, S/A IS ADVANCED BY ((NO OF RETARDATION + 1)/2) × ΔS/A |
| S18 | if $|\Delta P_i| \leq |\Delta P_{ip}|$, GO TO S19, ΔS/A STAY.<br>if $\Delta P_i$ INC, GO TO S15, ΔS/A = ADV.<br>if $\Delta P_i$ DEC, GO TO S16, S/A IS RETARDED BY PRECEDING ΔS/A × 1/2, however if the ΔS/A is SMALLER THAN ΔS/A$_{min}$, GO TO S19. |
| S19 | MEMORIZE $P_i$ VALUE, GO TO S1A, ΔS/A STAY |
| S1A | if $|\Delta P_i| \leq |\Delta P_{ip}|$, GO TO S2, ΔS/A STAYS.<br>if $\Delta P_i$ INC, OR $\Delta P_i$ DEC, GO TO S0, ΔS/A STAY. |

Explanation will be given to the cases for respective value of Flag F1 shown in Table 2. Hereinafter, Flag S10 to Flag S1A are simply described as S10 to S1A. The criteria is as mentioned before, based on the case of FIG. 6. First of all, at the ignition timing S/A (hereinafter, simply described as S/A), it is indefinite as for in what state the indicated mean effective pressure $P_i$ is, which is dependent on the running condition of the engine, compared with the ignition timing in case of the initially set value S/A$_0$. This initially set value S/A$_0$ is set at a retarded ignition timing which is in a non-knocking region for all running conditions of the engine.

This will be explained by FIG. 6. It is indefinite whether a initially set ignition timing is on the side of ①or on the side of ⑧, since a peak value of the indicated mean effective pressure $P_i$ moves to the advance side or to the retarded side, depending on the running condition of the engine. Accordingly, the indicated mean effective pressure $P_{i(i)}$ is measured, which is the standard of the state of Flag F1=S0 (that is, the state in which the ignition timing and the indicated mean effective pressure are not determined).

This is the state of Flag F1=S10. S/A is corrected to a retarded angle by a predetermined ignition timing change quantity $\Delta S/A$ (hereinafter, simply $\Delta S/A$).

That is, $S/A_{(i)}=S/A_{(i-1)}+\Delta S/A$ (hereinafter the expression $\Delta S/A=RE$ for the retardation of angle, is used for the above operation. $S/A_{(i)}$ is the current S/A, and $S/A_{(i-1)}$ is the preceding S/A). And Flag F1 is set to S11.

Next, explanation will be given for treatment in case of F1 is not equal to S10. As described in Table 2, in case that Flag F1 is not equal to S10, $S/A_{(i-1)}$ is memorized. The value of Flag F1 is determined by the preceding judgment.

As shown in the flow chart of FIG. 7, a comparison is made between the difference of the indicated mean effective pressure $\Delta P_i$ (hereinafter simply described as $\Delta P_i$) which is a value of the current indictated mean effective pressure $P_i$ subtracted by the preceding indicated mean effective pressure $P_{(i-1)}$, and the aforementioned dead zone $|\Delta P_{ip}|$ (hereinafter, simply described as $|\Delta P_{ip}|$). When $\Delta P_i>0$ and $\Delta P_i>|\Delta P_{ip}|$, $\Delta P_i$ is judged as increasing, or $\Delta P_i$ INC. When $P_i<0$, and $|\Delta P_i|>|\Delta P_{ip}|$, $\Delta P_i$ is judged as decreasing, or $\Delta P_i$ DEC.

Based on the result of the judgement, S/A is corrected. Explanation will be given to the case of Flag F1=S11. As described in Table 2, when $|\Delta P_i| \leq |\Delta P_{ip}|$, $\Delta S/A$ is $\Delta S/A=RE$, and Flag F1 is stays as S12 or S12 STAY.

When $\Delta P_i$ is increasing, $\Delta S/A$ is to be retarded, or $\Delta S/A=RE$, and Flag F1 is set as S13, or GO TO S13.

When $\Delta P$ is decreasing, S/A is corrected to the advance side by $\Delta S/A$. This operation is $S/A_{(i)}=S/A_{(i-1)}-\Delta S/A$ (hereinafter, this operation is shown by the expression as $\Delta S/A$ advancing, or $\Delta S/A=ADV$.

When Flag F1=S12, and when a $|\Delta P_i| \leq |\Delta P_{ip}|$, $\Delta S/A$ is advanced, or $\Delta S/A=ADV$, and Flag F1 is set as S14, or GO TO S14.

This case, as shown in aforementioned FIG. 6, corresponds to the state in which $|\Delta P_i|$ is smaller than $|\Delta P_{ip}|$, as the set ignition timing, and shows that the indicated mean effective pressure is in the range of its maximum.

This is just corresponds to the case of the ignition timing ② in FIG. 6. From this point the counting begins as for the number of times of $\Delta S/A$ for advancement, or $\Delta S/A=ADV$.

The count value is shown as $C_{AD(i)}$. At first $C_{AD}$ is set as 1.

When $\Delta P_i$ is increasing, or $\Delta P_i$ INC, $\Delta S/A$ is advancing, or $\Delta S/A=ADV$, and Flag F1 is set as S15, or GO TO S15.

When $\Delta P_i$ is decreasing, or $\Delta P_i=DEC$, $\Delta S/A$ is retarding, or $\Delta S/A=RE$, and Flag F1 is set as S16, or GO TO S16.

Next, explanation will be given to the case in which Flag F1=S13.

When $|\Delta P_i| \leq |\Delta P_{ip}|$, $\Delta S/A$ is retarding, or $\Delta S/A=RE$, and Flag F1 is set as S17, or GO TO S17.

This case corresponds to a state in which $|\Delta P_i|$ is smaller than $|\Delta P_{ip}|$, as for the set ignition timing shown in FIG. 6, and the indicated mean effective pressure is in the range of its maximum value. This case just corresponds to the ignition timing ⑦ in FIG. 6. In this case, $\Delta S/A$ is set as retarding, and judgment on whether the current indicated mean effective pressure has a maximum value, is to be made.

From this state, counting begins as for the number of the times of $\Delta S/A$ RE. The count value is shown as $C_{RE(i)}$. First of all, the $C_{RE}$ is set as 1.

When the $\Delta P_i$ is increasing, or $\Delta P_i$ INC, $\Delta S/A$ is made as retarding, or $\Delta S/A=RE$, and Flag F1 stays as S13, or S13 STAY.

When $\Delta P_i$ is decreasing, $\Delta S/A$ is made as advancing or S/A ADV, and Flag F1 is set as S18, or GO TO S18.

Next, explanation is given for the case of Flag F1=S14. As described in Table 2, when $|\Delta P_i| \approx |\Delta P_{ip}|$, $\Delta S/A$ is made as advancing, or $\Delta S/A$ ADV, Flag F1 stays as S14 or S14 STAY, and the number of times for advancement is made as $C_{AD(i)}=C_{AD(i-1)}+1$.

When $\Delta P_i$ is increasing, or $\Delta P$ INC, $\Delta S/A$ is made as advancing, or $\Delta S/A$ ADV, and Flag F1 is set as S15 or GO TO S15.

When $\Delta P_i$ is decreasing, the indicating mean effective pressure $P_i$ shown in FIG. 6 passed through the range of its maximum value.

Accordingly, the number of times for advancement of $C_{AD(i)}$ set as $C_{AD(i)}=C_{AD(i-1)}+1$, S/A is retarded by $(\Delta S/A \times C_{AD(i)} \times \frac{1}{2})$.

That is, $S/A_{(i)}$ is made as $S/A_{(i)}=S/A_{(i)}+(\Delta S/A \times C_{AD(i)} \times \frac{1}{2})$. Flag F1 is set as S19, or GO TO S19.

Next, explanation will be given the case Of Flag F1=S15. As described in Table 2, when $|\Delta P_i| \leq |\Delta P_{ip}|$, $\Delta S/A$ is made as advancing, or $\Delta S/A$ ADV, Flag F1 is set as S14, or GO TO S14. The number of times for advancement $C_{AD(i)}$ is set as $C_{AD(i)}=1$.

When $\Delta P_i$ is increasing, or $\Delta P_i$ INC, $\Delta S/A$ is made as advancing, or $\Delta S/A$ ADV, and Flag F1 stays as S15, or S15 STAY.

When $\Delta P_i$ is decreasing, $\Delta S/A$ is made as retarded, or $\Delta S/A$ RE, and Flag F1 is set as S16, or GO TO S16.

Next, explanation will be given the case of Flag F1=S16. When $\Delta P_i$ is decreasing, or $\Delta P_i$ DEC, $\Delta P_i$ is always decreasing, in spite of whether S/A is retarded or advanced by $\Delta S/A$.

In this case, the ignition timing, by changing it by $\Delta S/A$, jumps over the range wherein the indicated mean effective pressure is maximized, as shown in FIG. 6.

In this case, the range in which the indicated mean effective pressure has the maximum value, can never be detected.

Accordingly, S/A should be set alternately and repeatedly to the advancing side or to the retardation side, by halving $\Delta S/A$.

In this way, finally the value of $\Delta S/A$ is approaching to almost zero. The $S/A_{(i)}$ determined by this method, is regarded as the ignition timing in which the indicated mean effective pressure has a maximum value.

In case of Flag F1=S16 and Flag F1=S18, the direction of a change of the ignition timing is alternately changed between advancing and retarding, and, as shown in above, in case of decreasing of $\Delta P_i$, the size of $\Delta S/A$ is successively made small.

Accordingly, $\Delta S/A_{(i)}=\Delta S/A_{(i-1)} \times \frac{1}{2}$. When the $\Delta S/A_{(i)}$ becomes smaller than predetermined value of $\Delta S/A_{min}$, the value of $\Delta S/A$ is regarded as almost zero. In this case, Flag F1 is set as S19, or GO TO S19, and $S/A_{(i)}=S/A_{(i-1)}-\Delta S/A_{(i)}$.

When the $\Delta S/A_{(i)}$ is larger than $\Delta S/A_{min}$, Flag F1 is set as S18, or GO TO S18. The set value of the ignition timing is $S/A_{(i)}=S/A_{(i-1)}-\Delta S/A_{(i)}$.

Furthermore, when $|\Delta P_i| \leq |\Delta P_{ip}|$, the ignition time is determined as $S/A_{(i)}=S/A_{(i-1)}$, and Flag F1 is set as S19, or GO TO S19.

When $\Delta P_i$ increasing, or $\Delta P_i$ INC, $\Delta S/A$ is made as retarding, or $\Delta S/A=RE$, and flag F1 is set as S13, or GO TO S13.

Next, explanation will be given to the case in which Flag F1=S17. As described in Table 2, when $|\Delta P_i| \leq |\Delta P_{ip}|$, $\Delta S/A$ is made as retarding, or $\Delta S/A=RE$, Flag F1 stays as S17, or S17 STAY, and $C_{RE(i)}=C_{RE(i-1)}+1$.

When $\Delta P_i$ is increasing, or $\Delta P_i$ INC, $\Delta S/A$ is made as retarding, or $\Delta S/A=RE$, and Flag F1 is set as S13, or GO TO S13.

When the $\Delta P_i$ is decreasing, or $\Delta P_i$ DEC, S/A passes through the range in which the indicated mean effective pressure $P_i$ has a maximum value, as shown in FIG. 7.

Accordingly, the number of times for retarding the ignition timing is determined as $C_{RE(i)}=C_{RE(i-1)}+1$, and S/A is advanced by $(\Delta S/A \times C_{RE(i)} \times \frac{1}{2})$.

Accordingly, the ignition timing is determined as $S/A_{(i)}=S/A_{(i-1)}-(\Delta S/A \times C_{RE(i)} \times \frac{1}{2})$, and Flag F1 is set as S19, or GO TO S19.

Next, explanation will be given to the case of Flag F1=S18.

At described in Table 2, when $\Delta P_i$ is decreasing, this case is almost similar to the case of Flag F1=S16. In the case of Flag F1=S16, the direction of the operation of the preceding ignition timing is on the retarding side, whereas in the case in which Flag F1=S18, the direction of the operation of the preceding ignition timing is on the advancing side.

Accordingly, when $\Delta P_i$ is decreasing, or $\Delta P_i$ DEC, $\Delta S/A_{(i)}$ is determined as $\Delta S/A_{(i)}=\Delta S/A_{(i-1)} \times \frac{1}{2}$, and when $\Delta S/A_{(i)}$ is smaller than $\Delta S/A_{min}$, $S/A_{(i)}$ is determined by $S/A_{(i)}=S/A_{(i-1)}+\Delta S/A_{(i)}$, and Flag F1 S Set to S19, or GO TO S19.

When $\Delta S/A_{(i)}$ is larger than the predetermined value of $\Delta S/A_{min}$, $S/A_{(i)}$ is determined as $S/A_{(i)}=S/A_{(i-1)}$ as $\Delta S/A$, and Flag F1 is set as S16, or GO TO S16.

When $|\Delta P_i| \leq |\Delta P_{ip}|$, $S/A_{(i)}$ is determined as $S/A_{(i)}=S/A_{(i-1)}$, and Flag F1 is set as S19, or GO TO S19.

When $\Delta P_i$ is increasing, or $\Delta P_i$ INC, $\Delta S/A$ is made as advancing, or $\Delta S/A=ADV$, and Flag F1 set to S15, or GO TO S15.

By carrying out the above operations, Flag F1 is finally set as S19. When Flag F1=F19, the indicated mean effective pressure is judged to be the maximum value in the preceding setting of the ignition timing.

Accordingly, in this case, the ignition timing is set as the same value thereof, and a check is made on whether $|\Delta P_i|$ is in the range of $|\Delta P_{ip}|$.

In spite of the change of $\Delta P_i$, that is, when Flag F1=S19, $S/A_{(i)}$ is determined as $S/A_{(i)}=S/A_{(i-1)}$, and Flag F1 is set as S1A.

Next, explanation will be given to the case of Flag F1=S1A. In this case, when the ignition timing is set in which the indicated mean effective pressure is maximized, in Flag F1=S19, and when the $\Delta P_i$ is smaller than $|\Delta P_{ip}|$, that is, the absolute value of $\Delta P_i$ is smaller than the width of variation of a predetermined indicated mean effective pressure, a judgment is made that the indicated mean effective pressure $P_i$ is maximized at the set value of the ignition timing. When $\Delta P_i$ is increasing or decreasing, $\Delta S/A$ stays as the same, and Flag F1 is set as S0.

Next, the logic for obtaining the ignition timing in which the indicated mean effective pressure $P_i$ is maximized, will be explained referring to the flow chart in FIG. 7. The treatment of the flow chart in FIG. 7, as mentioned before, is carried out after calculations made for 720 degrees CA by the interruption treatment of program generated at each predetermined crank angle, and the value of $P_i$ is renewed. 101, 102, 103 etc. in FIG. 7, show the treating steps.

In Step 101, as state quantities to judge the running condition of the engine, the revolution number of the engine $N_{(i)}$ obtained from signal X3 of the crank angle sensor 16 and the suction air quantity $Q_{(i)}$ from the signal X1 of the air-flow meter 9, are read by the control device. Furthermore, the indicated mean effective pressure $P_{i(i)}$ is read by the control device which is obtained, at the interruption mentioned above, from the inner cylinder pressure signal X4 of the pressure sensor 19, and the signal X3 of the crank angle sensor 16.

Next, in Step 102, the aforementioned value of Flag F1 is checked. When Flag F1=S0 (initial state), the operation goes to Step 106. Where NOT Flag F1=S0, the operation goes to Step 103. In Step 103 a check is made on whether the revolution number of the engine $N_{(i)}$ is the same with the revolution number of the engine Ns which is the value in the preceding treatment, and, whether the suction air quantity $Q_{(i)}$ is the same with the preceding suction air quantity $Q_s$. In this case, although it is not shown in the flow chart, the judgment on whether $N_s=N_{(i)}$ and $Q_s=Q_{(i)}$, may be carried out with a certain width of a dead zone. For instance, suppose that $|\Delta N|$ is the width of the dead zone, and the following equation is established, $N_s=N_{(i)}$.

$$|(N_s-N_{(i)})| \leq |\Delta N|$$

And the same as above in case of $Q_s=Q_{(i)}$, by using a dead zone of $|\Delta Q_s|$, when the following equation is established, $Q_s=S_{(i)}$.

$$|(Q_s-Q_{(i)})| \leq |\Delta Q_s|$$

When in Step 103, a judgment is made as NOT $N_s=N_{(i)}$ OR NOT $Q_s=Q_{(i)}$, the engine is not running in steady state, and the operation goes to Step 104. When the engine is judged to be running in steady state, and $N_s=N_{(i)}$ and $Q_s=Q_{(i)}$, the Operation goes to Step 109.

In Step 109, the averaging treatment of value of $P_i$, is carried out, by using the value of $P_i$ which is measured this time. The averaging of the indicated mean effective pressure, is performed to absorb a variation of the measured value due to, as mentioned before, the variation with cycle of the combustion of the engine.

Although not shown in the flow chart, the method of the averaging treatment of the indicated mean effective pressure $P_i$ is carried out as follows. (The summation of the indicated mean effective pressure $P_i$, which has been measured until the preceding time, is $SP_i$.) $SP_{i(i)}$ is obtained as $SP_{i(i)}=SP_{i(i-1)}+P_{i(i)}$. The summention of $SP_{i(i)}$ until the current measured value of $P_i$. In this expression (i) denotes a current measured value and the treatment value, (i−1) denotes the preceding measured value or the preceding treatment value. After the treatment is finished, the counter for averaging number $C_{pi}$ (hereinafter $C_{pi}$) is incremented. When $C_{pi}=NC_{pi}$ (a predetermined value), the averaging is finished, and $C_{pi}$ =0. When $C_{pi} \neq NC_{pi}$, the averaging is not finished. This $NC_{pi}$ is a number for averaging, which as mentioned before, can absorb the variation of the value $P_i$. When $C_{pi} = NC_{pi}$, the averaged indicated mean effective pressure $P_{iAVE}$ is calculated according to following equation.

$$P_{iAVE} = SP_{i(i;NCpi)}/NC_{pi}$$

By the above mentioned method, the averaging treatment of the indicated mean effective pressure is carried out.

Next, the operation goes to Step 105. In Step 105, as mentioned before, when the averaging treatment is finished, $C_{pi} = 0$. A judgment is made whether the averaging treatment is finished, corresponding to the value of $C_{pi}$. When a judgment is made in which the averaging operation is finished, the operation goes to Step 108. When a judgment is made in which the averaging operation is not finished, the operation goes to Step 117.

In Step 108, a calculation is made by the following equation, as for the difference between the previously measured and averaged, indicated mean effective pressure $P_{iAVE(i-1)}$ and the current value $P_{iAVE(i)}$, which is the difference of the indicated mean effective pressure $\Delta P_i$.

$$\Delta P_i = P_{iAVE(i)} - P_{iAVE(i-1)}$$

The previous $P_{iAVE(i-1)}$ is renewed to the current value $P_{iAVE(i)}$. When the Flag F1 = S10, the value corresponding to the previous $P_{iAVE(i-1)}$ does not exist. Because, when Flag F1 = S10, the value of $P_i$ is to be measured, and then $P_{iAVE(i)}$ is to be calculated for the first time. Accordingly, when Flag F1 = S10, in the above calculation equation of $\Delta P_i$, a calculation is carried out in which a predetermined value is put in $P_{iAVE(i-1)}$, or $\Delta P_i$ is not calculated. Because, in the successive treatment, when Flag F1 = S10, the value of the $\Delta P_i$ is not used in the treatment. After the value of $\Delta P_i$ and the value of $P_{iAVE}$ are renewed, the operation goes to step 111.

Figure 8:
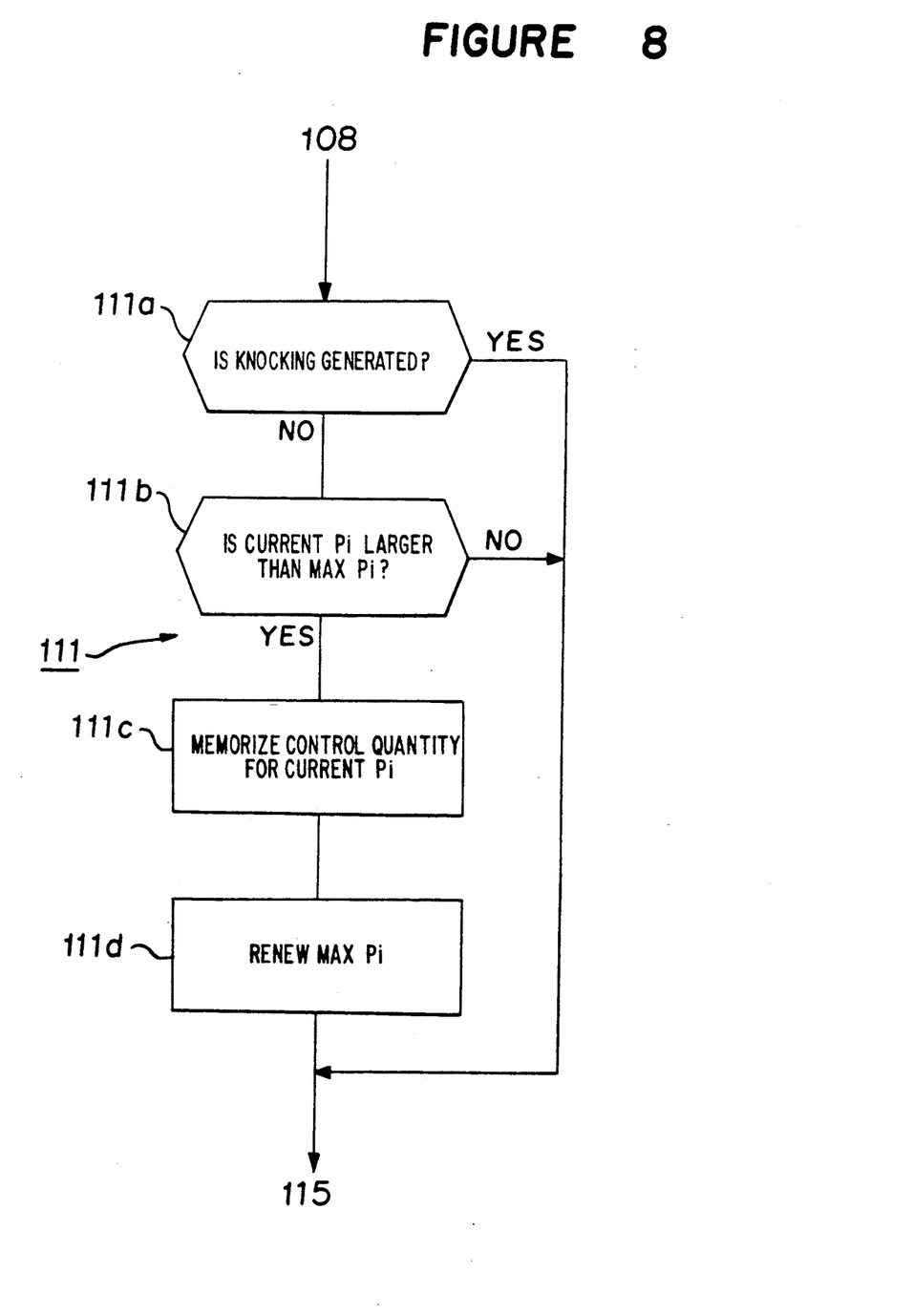
FIG. 8 is a flow chart showing a detailed treatment of Step 111 in FIG. 7.

In step 111, a treatment shown in FIG. 8 is carried out. A treatment is carried out in which the maximum value $P_{imax}$ of the value of $P_i$ in non-knocking time and S/A control quantity corresponding to the maximum value are memorized. After the treatment the operation goes to the next Step 115.

In Step 115, Flag F1 is checked. When Flag F1 = S2, the ignition timing in set to a value in which the indicated means effective pressure is maximized, and the operation goes to Step 118. When NOT F1 = S2, F1 is S10 to S1A, the operation goes to Step 116 to carry out a treatment to determine the ignition timing in which the indicated mean effective pressure is maximized.

In Step 116, a treatment is carried out following Flag F1, and following the content of Flag F1. This treatment is for determining the ignition timing in which indicated mean effective pressure is maximized, as explained by Table 1 and Table 2. After, in step 116, the treatment following the content of Flag F1 is finished, the operation goes to Step 117.

Figure 9:
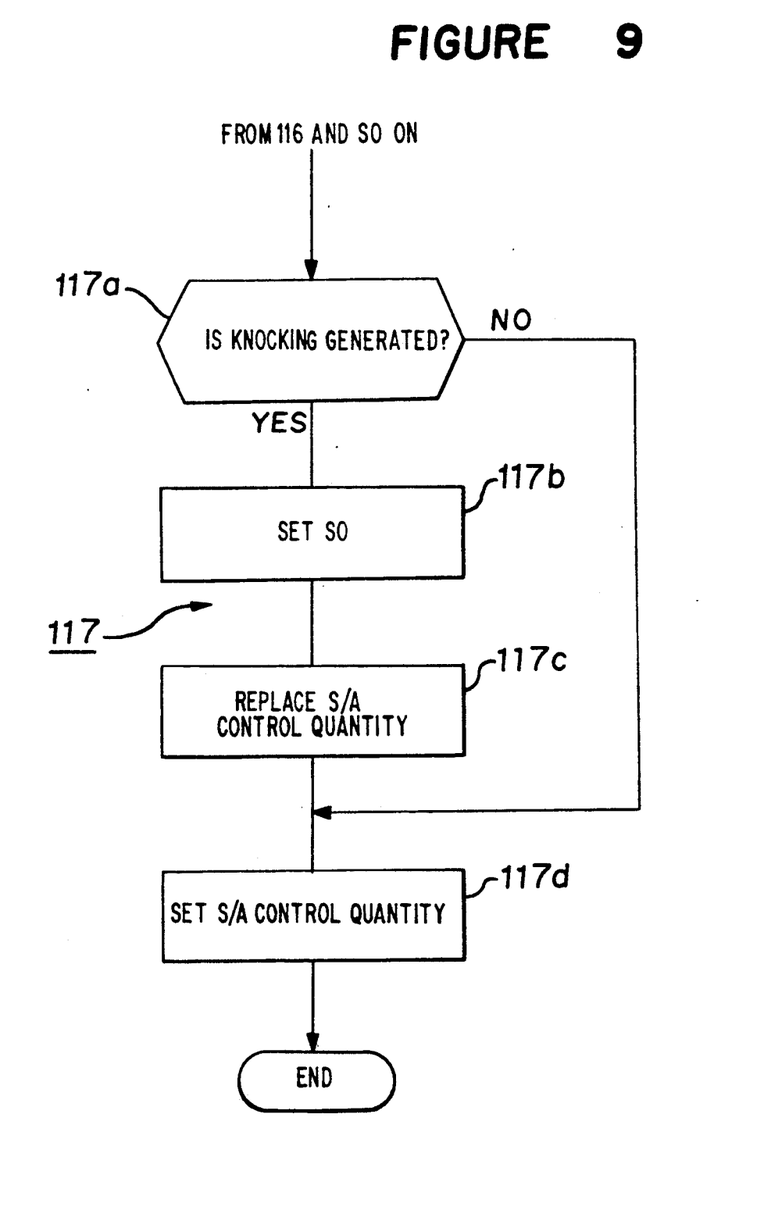
FIG. 9 is a flow chart showing a detailed treatment of Step 117 in FIG. 7.

In Step 117, the treatment shown in FIG. 9 is carried out. In non-knocking time, S/A determined in Step 116, or the previously set S/A, or the initialized S/A = S/A$_0$, is utilized. In knocking time, S/A is replaced by S/A which is memorized in Step 111, and control is made by the desired ignition time S/A. Then, the current treatment is finished.

In Step 104, the ignition timing S/A is initialized. That is, S/A = S/A$_0$, and the operation goes to Step 106.

Step 106 is for the case when the running condition of the engine is changed, or at an initial state. The revolution number of the engine $N_s$ which is the standard for determining steady state, and the suction air quantity $Q_s$ which is also the standard for determining steady state, are reset. The averaging treatment of the value of $P_i$ is started. As initializing of the averaging treatment of the value of $P_i$, $SP_i = 0$. And Flag F1 is set as F1 = S10, and the operation goes to Step 117.

In step 118, after a setting is made on the ignition timing in which $P_i$ is maximized by the calculation S10 to S1A, a check is carried out to detect that the set ignition timing is deviated from the set value for some cause. In Step 118, a judgment is made whether $|\Delta P_i| \leq |\Delta P_{ip}|$ and when the above equation is established, the operation goes to Step 117.

In Step 120, Flag F1 is set as S0, and the operation goes to Step 117. The Step 120 is for a case in which after on the converging state S2 is established, and even at the same point of the ignition timing, the value of $P_i$ varies considerably for some cause. In this case, the ignition timing is reset to a value in which the indicated mean effective pressure $P_i$ is maximized. In this case S/A is not initialized, and the previously set values are utilized.

As mentioned above, a logic to determine the ignition timing in which the value of $P_i$ is maximized, is explained. Although not explained in the flow chart of FIG. 7, when the treatment to determine the ignition timing in which the value of $P_i$ is maximized, as shown in the flow chart in FIG. 7, is not operated, S/A is initialized as S/A = S/A$_0$.

A detailed explanation will be given as for Steps 111 and 117 in FIG. 7 by utilizing flow charts in FIG. 8 and FIG. 9.

First of all, referring to the flow chart in FIG. 8 the treatment of Step 111 will be explained. In Step 111a, as mentioned above, a judgment is made on whether the knock flag FnK is set, which is set or reset by an interruption treatment routine, not shown, or whether the knocking is generated. When knocking is generated, the operation jumps to step 115. When knocking is not generated, the operation goes to step 111b.

In step 111b, the current value of $P_i$ is compared with the maximum value of $P_i$, $P_{imax}$ which is stored in the control quantity memorizing mean 33 in FIG. 5. When the current value of $P_i$ is smaller than $P_{imax}$, the operation jumps to Step 115. If the current value of $P_i$ is larger than $P_{imax}$, the operation goes to Step 111c, and the S/A control quantity which corresponds to the current value of $P_i$, is memorized in the control quantity memorizing means 33.

In step 111d, the current value of Pi is memorized in control quantity memorizing means 33, as the maximum value of $P_i$, $P_{imax}$ for the renewal of the value of $P_{imax}$, and the operation goes to the next step 115.

Next, referring to the flow chart in FIG. 9, the treatment in Step 117 will be explained. First of all, in Step 117a, judgment is made on whether the knock flag FnK is set, or whether knocking is generated.

If the knocking is not generated, the operation jumps to Step 117d. When the knocking is generated, the operation goes to Step 117b, and Flag F1 is set as S0.

In Step 117c, the S/A control quantity memorized in the control quantity memorizing means 33, is read out and replaced with the current S/A control quantity, and the operation goes to the next Step 117d.

In Step 117d, S/A quantity which is replaced by the generation of knocking, or which is not replaced by non generation of knocking, is set, and the operation is finished.

Figure 10:
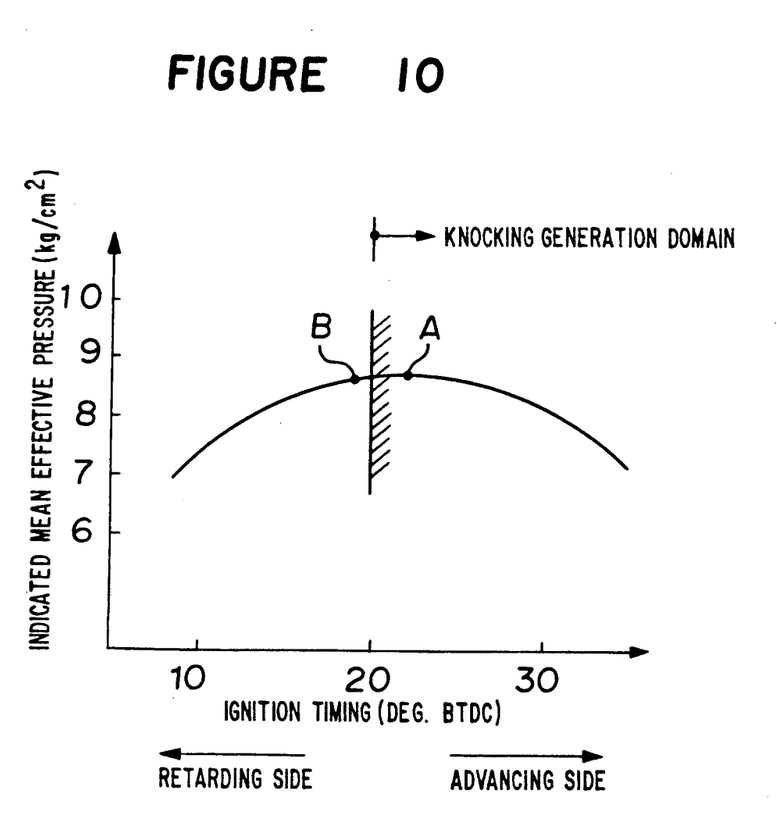
FIG. 10 is a explanatory graph showing the indicated mean effective pressure characteristic for the ignition timing, and the method of control of the ignition timing in case of the generation of knocking.

FIG. 10 shows the relationship between S/A and $P_i$ and the region in which the knocking is generated. S/A of the engine should be determined by the state of the engine so that the engine is a operated in an optimum condition. The bold line in FIG. 10 shows a characteristic of $P_i$ corresponding to S/A before the top dead center in compression. Generally speaking $P_i$ is increased when S/A is advanced. When S/A is advanced further, $P_i$ is decreased. Point A is where the output of the engine is maximized. However, in a certain running condition of the engine, the point A may be included in the region in which knocking generated. In this case, when S/A is advanced from the initial set value of $S/A_0$ in the region in which the knocking is not generated by increments of $\Delta S/A$, knocking is generated finally, which causes a trouble in the running of the engine. Therefore, S/A at point B which corresponds to the current maximum value of $P_i$ outside the region in which the knocking is generated, shown by hatching, is memorized as the control quantity of S/A, and the ignition is to be made by the S/A quantity at point B.

In the above embodiment, the initial set value of the ignition timing is made as a value corresponding to the running condition of the engine in the region in which knocking is not generated, which may be converted to a data table according to the running condition of the engine, by which S/A may be set by looking up the table.

As mentioned above, according to the invention, an inner cylinder pressure is detected, from which an indicated mean effective pressure is obtained. The ignition timing is controlled by a feedback control so that mean value of the indicated mean effective pressure which directly shows the output of the engine, is maximized. The knocking is detected by the inner cylinder pressure. The ignition timing control quantity for non-knocking time, which maximizes the average value of the indicated mean effective pressure, is memorized. When the knocking is generated, the ignition timing is set to the memorized value. Therefore the engine can be operated at the optimum ignition timing in spite of the variation of parts of the engine, or their timewise change or the change in environment, which a enhances the output of the engine. Furthermore, even when the knocking is generated, the knocking is controlled, and the output of the engine is controlled to the maximum value.

What is claimed is:

1. An ignition timing control apparatus for an internal combustion engine which comprises:

pressure detecting means for detecting a pressure in a cylinder of the internal combustion engine;

knocking detecting means for detecting a level of the knocking in the internal combustion engine based on an output of the pressure detecting means;

crank angle detecting means for detecting a crank angle;

indicated mean effective pressure calculating means for calculating an indicated mean effective pressure of the engine from the output of the pressure detecting means and an output of the crank angle detecting means;

indicated mean pressure averaging means for averaging an output of the indicated mean effective pressure calculating means;

load detecting means for detecting a load of the internal combustion engine;

revolution number detecting means for detecting a revolution number of the internal combustion engine from an output of the crank angle detecting means;

running condition judging means for judging a running condition of the internal combustion engine from an output of the load detecting means and an output of the revolution number detecting means;

control means for controlling an ignition timing so that an average value of the indicated mean effective pressure is maximized, in a predetermined running condition of the engine determined by the running condition judging means; and control quantity memorizing means for memorizing an ignition timing control quantity in case when a knocking is not generated, which maximizes the average value of the indicated mean effective pressure outputted from the control means;

said control means controlling the ignition timing, in a region in which the knocking is not generated, based on a memorized value of the control quantity memorizing means, when the knocking detecting means detects a knocking.

* * * * *